Dec. 22, 1931.  E. MAYER  1,837,563
STARTING CONNECTION FOR ALTERNATING CURRENTS
Original Filed Jan. 9, 1924
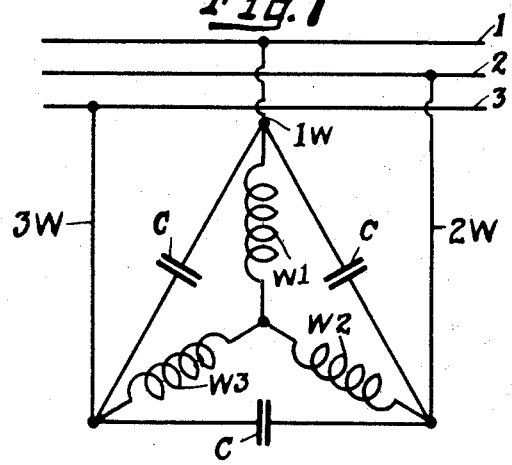
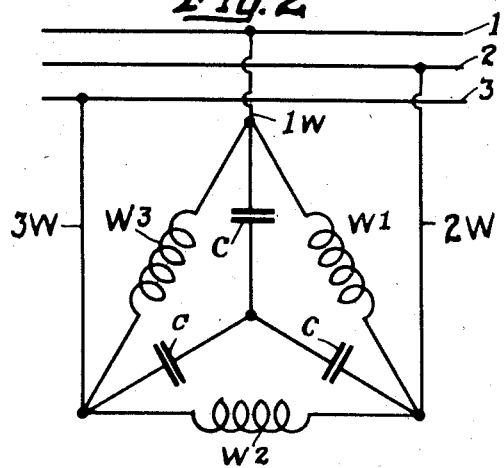
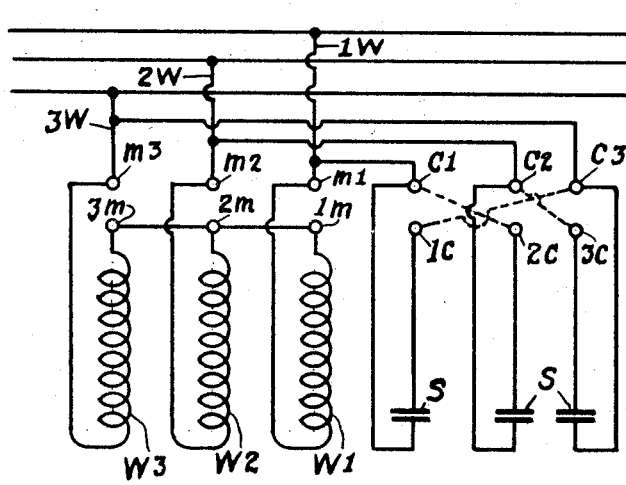
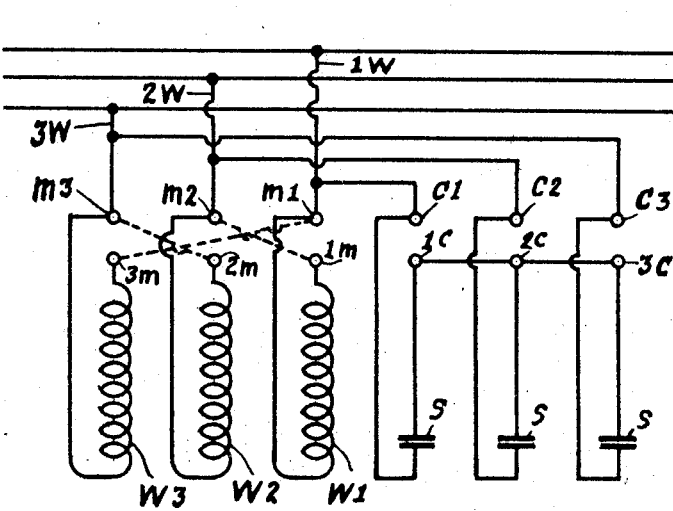
INVENTOR
Emil Mayer
BY
Otto Ratz
ATTORNEY Patented Dec. 22, 1931

1,837,563

UNITED STATES PATENT OFFICE

EMIL MAYER, OF SCHENECTADY, NEW YORK

STARTING CONNECTION FOR ALTERNATING CURRENTS

Original application filed January 9, 1924, Serial No. 685,212, and in Germany October 31, 1923. Divided and this application filed April 6, 1928. Serial No. 268,066.

This application is a division of application U. S. Serial No. 685,212, filed on January 9, 1924, now Patent No. 1,678,897, June 12, 1928.

My invention relates to improvements in starting apparatus for electric motors, particularly alternating current motors having either wound or unwound rotors.

An object of my invention is to provide a starting arrangement for alternating current motors using electrical condensers either alone or in combination with resistances; with the result that I can obtain larger torque with smaller starting currents, because the condensers influence the phase of the starting current more strongly than a resistance; and thus with a given current, a larger torque can be developed.

A further object of my invention is to provide a method of starting alternating current motors adapted to permit the phase-compensation condensers employed with alternating current motors of this and other types, to be utilized for purposes of starting; and after starting to be restored to their proper relations in the circuit to function as phase-compensation condensers for the regular operation of such motors.

Other objects and advantages of the invention will appear from the following description, which shows connections and circuits according to my invention; but it is to be understood, however, that this disclosure is illustrative only and I do not wish to be necessarily limited to what is described, or shown upon the drawings, and I reserve the right to make any changes which come within the scope and spirit of the invention as the same are indicated in the appended claims.

On the drawings, Fig. 1 is a diagrammatic view showing the connections for starting an alternating current motor having an unwound rotor;

Fig. 2 shows such connections for normal running;

Fig. 3 is a view showing the same conditions as Fig. 1, with switch terminals for changing the connections from starting to running, included; and, Fig. 4 is a view similar to Fig. 2 showing the connections altered to establish regular running conditions.

In the drawings, the invention is illustrated in connection with alternating currents of three phases, but obviously, I may practice the invention with motors taking current of a different number of phases; and, in fact, with alternating current motors in general, after the manner set forth in the actual embodiment of my invention which is here represented for purposes of explanation.

Referring first to Fig. 1, I show a three-phase alternating arrangement in which the operating current is taken from the main leads, 1, 2 and 3. The motor windings are indicated at $w1$, $w2$, and $w3$ respectively, and having its opposite extremity connected to a common terminal of the three windings; so that these windings are joined in the so-called star or Y connection.

Condensers are indicated at $c$, united to the terminals of the three windings $1w$, $2w$, and $3w$, which are joined to the main supply wires, that is, each of the condensers will be bridged across two of the windings of the motor, so that while the motor windings are in Y connection, the condensers themselves will be connected in delta. The windings are, of course, the field windings, and in connection with Fig. 1, it is to be remembered that the motor is to have an unwound rotor, for example, a rotor of the squirrel cage type.

Such a motor can be started with connections as shown in Fig. 1, but after starting, and for normal running the windings and condensers must be placed in the relations shown in Fig. 2. This view shows the three windings connected in delta, and the three condensers connected in star or Y, for the motor to operate in the usual way, under normal conditions. With the connections shown in Figs. 1 and 2, the usual resistances are either not required, or smaller resistances than usual can be employed. Also the starting period is short, and during that period the aggregate condenser capacity can be subjected to greater stress without danger; and to that end the condensers can be so connected that they possess a greater aggregate capacity at starting; and thereby the object of the inclusion of the condensers can be gained with a smaller and cheaper condenser construction.

In Figs. 3 and 4, I show means whereby the connections can be changed from the arrangement utilized for starting, as indicated in Fig. 1, to that utilized for regular operation, indicated in Fig. 2.

In Fig. 3, the three windings, $w1$, $w2$ and $w3$, are each united at one end to one of the main leads, and the opposite extremity of the three windings are each joined to separate switch terminals, $1m$, $2m$ and $3m$. These three terminals are all connected together to put the three motor windings in Y or star.

In the line of the conductors, $1w$, $2w$ and $3w$, are other switch terminals $m1$, $m2$ and $m3$, each being opposite one of the switch terminals just mentioned. Thus the winding $w1$, for instance, will have one end joined to the switch terminal $1m$, and the opposite extremity joined to the terminal $m1$, which is connected to the lead 1, and so with the other two windings.

The condensers are shown at S, and each condenser will have its opposite extremities connected to a pair of switch terminals, the same as the motor windings. A conductor will run from the switch terminal $m1$ to a terminal $c1$, to which one pole of one of the condensers is joined, and opposite this terminal $c1$ is another terminal $1c$, united to the other pole of the condenser. Two more opposite switch terminals, $c2$ and $2c$ and $c3$ and $3c$ for the other two condensers, will be provided; and the terminal $c2$ will be joined to the wire $2w$, and the terminal $c3$ to the wire $3w$, the two condensers for these extra two pairs of switch terminals being joined thereto in the same way as the first condenser. With the terminals, $1m$, $2m$, and $3m$ all joined together, as indicated by the straight line, and the switch terminal $c1$ connected to switch terminal $2c$, switch terminal $c2$ to switch terminal $3c$, and switch terminal $1c$ to terminal $c3$, it will be apparent that with the windings in star, the condensers will be in delta, as Fig. 1 shows them. The motor can then be started with these connections; the relation in which the switch terminals are united being indicated by the broken lines in Fig. 3. For running, the connections are changed between the three sets of the motor winding terminals and the three pairs of condenser terminals to put the condensers in star and the windings in delta; the manner in which the various switch terminals are now joined being indicated in Fig. 4; a single straight line being employed to unite the terminals $1c$, $2c$ and $3c$, to show the three condensers with one pole united to a single point and broken lines to indicate the manner of joining up in the proper way, the terminals for the windings $w1$, $w2$ and $w3$. Fig. 4, in other words, shows the windings connected the same as the condensers are connected in Fig. 3. Obviously, a single switch may be utilized to connect the switch terminals, as indicated in Fig. 3 and then as indicated in Fig. 4. For this purpose, the switch terminals that I have described may be mounted so as to be fixed or stationary and may work in combination with a rotatable member designed to connect them as required, after the fashion of a rotary controller. I do not describe such a controller fully here as my invention is concerned more with the broad idea of making the connections for starting and normal operation in the manner set forth, and not particularly with any especial switching devices which may be useful for my purpose.

Having described my invention what I believe to be new and desire to secure and protect by Letters Patent of the United States is:—

1. The method of operating alternating current motors which comprises connecting condensers in delta and to the motor windings during starting and connecting the condensers in star connection for running.

2. The method of operating alternating current motors which comprises connecting during starting, the motor windings in star and condensers in delta and in shunt with the windings and during operation connecting the motor windings in delta and the condensers in star and in shunt with the windings.

In testimony whereof I have affixed my signature.

EMIL MAYER.